United States Patent
Kasbarian

(10) Patent No.: US 9,262,606 B2
(45) Date of Patent: Feb. 16, 2016

(54) SYSTEMS AND METHODS FOR PAIRING IDENTIFICATION DATA TO A NETWORK-BASED SERVICE

(71) Applicant: Zypline Services, Inc., Palo Alto, CA (US)

(72) Inventor: Raymond P. Kasbarian, Palo Alto, CA (US)

(73) Assignee: Zypline Services, Inc., Palo Alto, CA (US)

( * ) Notice: Subject to any disclaimer, the term of this patent is extended or adjusted under 35 U.S.C. 154(b) by 0 days.

(21) Appl. No.: 13/573,798

(22) Filed: Oct. 3, 2012

(65) Prior Publication Data
US 2013/0086697 A1 Apr. 4, 2013

Related U.S. Application Data

(60) Provisional application No. 61/542,685, filed on Oct. 3, 2011.

(51) Int. Cl.
*G06F 21/31* (2013.01)
*H04L 29/06* (2006.01)
*G06F 21/62* (2013.01)

(52) U.S. Cl.
CPC ............ *G06F 21/31* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 6,141,413 A | 10/2000 | Waldner et al. | |
| 6,748,057 B2 | 6/2004 | Ranalli et al. | |
| 6,775,366 B1 | 8/2004 | Cobbett et al. | |
| 2003/0050984 A1* | 3/2003 | Pickup et al. | 709/206 |
| 2005/0026636 A1 | 2/2005 | Yoon | |
| 2009/0119315 A1 | 5/2009 | Kasbarian | |
| 2011/0237222 A1* | 9/2011 | Niejadlik | 455/411 |
| 2013/0179956 A1* | 7/2013 | Mardikar et al. | 726/7 |

FOREIGN PATENT DOCUMENTS

| | | |
|---|---|---|
| CN | 1387363 | 12/2002 |
| GB | 2358718 | 8/2001 |
| JP | 2006072945 | 3/2006 |

OTHER PUBLICATIONS

Wikimedia Foundation, Inc., "URL Shortening," Wikipedia online encyclopedia entry, Sep. 18, 2011 [retrieved from the Internet on Jan. 17, 2013 at http://web.archive.org./web/20110925051439/http://en.wikipedia.org/wiki/URL_shortening].

* cited by examiner

*Primary Examiner* — Jeffery Williams
(74) *Attorney, Agent, or Firm* — Sheppard, Mullin, Richter & Hampton LLP

(57) ABSTRACT

Disclosed are methods and systems of providing access, indexing, and/or connecting a user to a network-based service, associated with a particular entity, using an identifier that can be uniquely associated with the particular entity (e.g., with respect to a given scope of identification), can be proprietary to the entity, and/or issued by a third-party (i.e., a party not providing the method or system). A method can comprising receiving from a client computer system an entity identifier uniquely associated with a real world entity in a scope of identification, the entity identifier being issued by a third-party in association with the real world entity. The method can select a network-based service uniquely associated with the entity identifier, determine a public access parameter to the network-based service, and provide the client computer system with public access to the network-based service according to the public access parameter.

18 Claims, 7 Drawing Sheets

SYSTEMS AND METHODS FOR PAIRING IDENTIFICATION DATA TO A NETWORK-BASED SERVICE

CROSS-REFERENCE TO RELATED APPLICATIONS

This application claims priority to U.S. provisional Ser. No. 61/542,685, filed Oct. 3, 2011, entitled "SYSTEM AND METHOD FOR PAIRING IDENTIFICATION DATA BASED ON DIGITAL INDEXES TO SINGLE LOCATION ON A NETWORK," which is incorporated by reference.

BACKGROUND

Presently, the most relevant data and information on individuals, companies and products is spread across a wide variety of increasingly complicated websites. Getting to a person's profile, a company's management team, a restaurant's menu, or a retailer's daily special is a time-consuming and multi-step process. Traditionally, access to such web resources are achieved by one three ways: a) search engine; b) traversing a link (e.g., hyperlink) to the web resource; or c) typing the universal resource location (URL) to the web resource letter-by-letter.

Some solutions have been employed in order to mitigate the problems attributed with Internet search. For example, short URL services provide redirect services based on short URLs, thereby obviating the need to type in long and complex URLs. Other examples include bar codes and QR codes, which generally target the print-to-web problem by making a connection to a website through a smartphone that scans the bar code/QR code and redirects the smartphone user to an associated web page (e.g., or saves the associated URL to the smartphone).

However, such solutions are plagued by their own problems. For instance, short URL services often utilize dynamically generated URLs that are generally nonsensical and, thus hard to remember despite how short the URL. This can make remember the URL hard to remember when the URL is received in "offline" situations (e.g., verbally). With respect to bar codes and QR codes, the code is generally unintelligible without use of a smartphone, or similar computing device, that is configured to receive and translate the code to an intelligible URL. Additional, remembering a bar code or QR code without the assistance of a computing device would be next to impossible. Additionally, with respect to short URL service and bar codes/QR codes, typically the URL or code (using a computing device) for the specific purpose of referencing a given web page.

SUMMARY

Disclosed are methods and systems of providing access, indexing, and/or connecting a user to a network-based service, associated with a particular entity, using an identifier that can be uniquely associated with the particular entity (e.g., with respect to a given scope of identification), can be proprietary to the entity, and/or issued by a third-party (i.e., a party not providing the method or system).

According to some implementations, systems and methods are provided that receive from a client computer system an entity identifier uniquely associated with a real world entity in a scope of identification, the entity identifier being issued by a third-party in association with the real world entity, select a network-based service uniquely associated with the entity identifier, determine a public access parameter to the network-based service, and provide the client computer system with public access to the network-based service according to the public access parameter.

The entity identifier can be a telephone number, an e-mail address associated with the real world entity, or an alphanumeric string associated with and proprietary to the real world entity. The scope of identification can be implemented in an index of unique identifiers issued to the real world entity by the third-party. The network-based service can be selected from a plurality of network-based services associated with the real world entity, and the method further comprising receiving an affix with the entity identifier, the affix identifying the network-based service from another network-based service in the plurality of the network-based service. The affix can be received as a suffix or a prefix to the entity identifier.

For some implementations, the systems and methods can determine a geographical location of the client computer system, wherein the geographical location assists in determining the scope of identification.

Additionally, the systems and methods can receive from the client computer system a request for private access to the network-shared service, perform an approval process for providing private access to the network-shared service, and upon approval, providing the client computer system private access to the network-based service. According to some implementations, performing the approval process for providing private access can comprise soliciting approval from the entity for the request for private access, the solicitation (e.g., time-sensitive and/or having an set expiration) being transmitted to the entity by a communication system operable with the entity identifier. Further, performing the approval process for providing private access can comprise generating a passcode in connection with the network-based service, delivering the passcode to the entity by way of a communication system operable with the entity identifier, and prompting the client computer system for the passcode (e.g., time-sensitive and/or having an set expiration).

Depending on the implementation, the network-based service comprising a web page, web-based access to a document file, a web-based file sharing service, or a web-based media album. The real world entity could be a person, a family, a government organization, a business organization, or a non-business organization.

Various implementations provide effectiveness and efficiency to getting to desired information without much hassle. Various implementations can: eliminate the need to type a universal resource locator (URL) letter-by-letter; avoid exposure to the intercept marketing of general search (e.g., hijacking and competitive ads); protect advertisers and increases traffic to publisher's web sites; reach an entity's web site like with just a telephone number associated with entity; enable individuals to manage their "online identity" without having to buy a domain; accurately connect users to entity-associated network-based services without any language confusion (e.g., domain names are now permitted in many languages and different alphabets); eliminate sending announcements to colleagues when changing primary social network or personal brand page; always connects to the current data; eliminate interrupting telephone calls when people call companies and ask for web site; or use mobile telephone number as a pseudo-domain that provides individuals their own private network with unlimited/unrestricted sub-page names.

Implementations can include: a global platform for registrations and connections; sub-page indexing systems for commercial websites; unique agency jump code indexing system; private asynchronous on-demand messaging system; instant web presence process for individuals and proprietorships; core strategic connection applications in all key markets; or an access connection box (e.g., widget) or application programming (API) for partners and developers.

DETAILED DESCRIPTION

Figure 1:
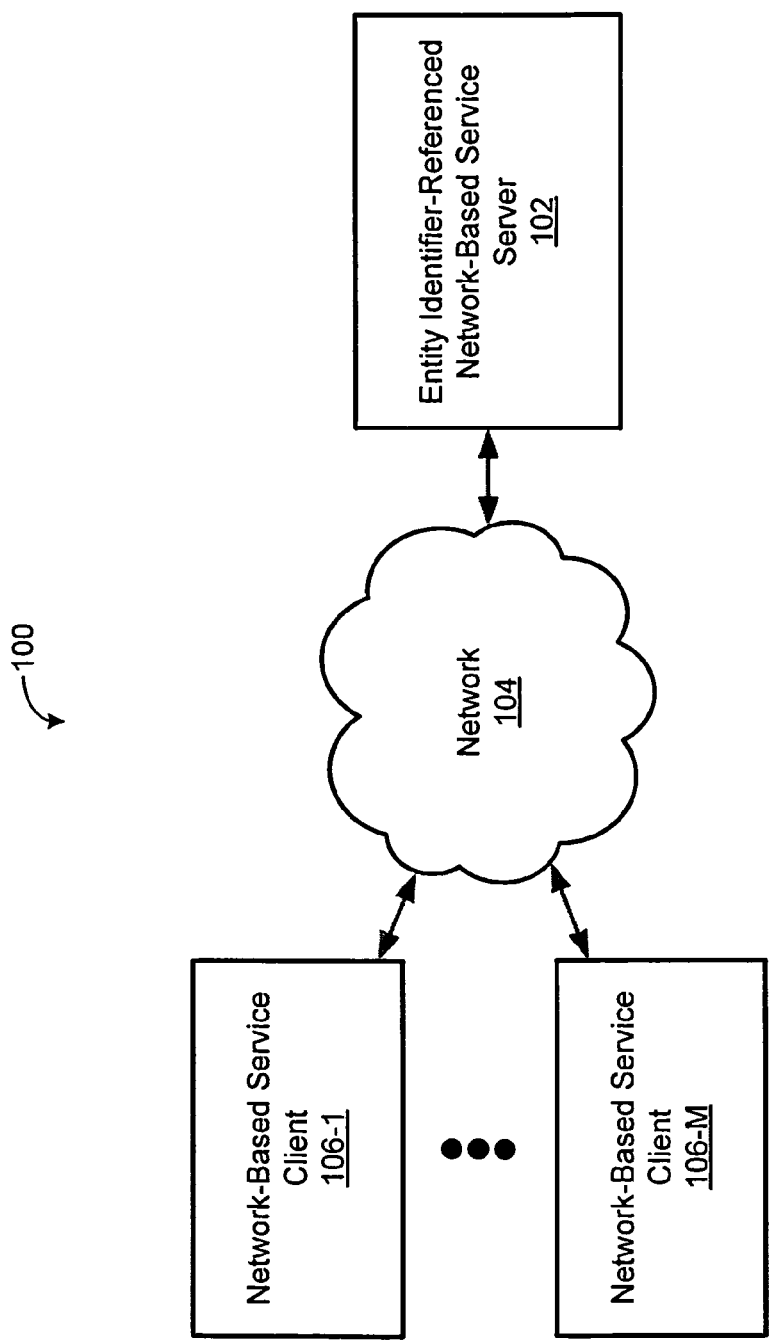
FIG. 1 shows an example of an entity identifier-referenced network-based service system in accordance with some implementations.

Various implementations utilize identification data, which is uniquely associated with a given entity (e.g., individual, group of individuals, a business, or a company) within a given scope of identification (e.g., a given index of identifiers), to provide quick and easy connection and/or access to one or more network-based services (e.g., computing resource delivered via a network, such as a HTML file) that are uniquely associated with the given entity. Identification data for a given entity can include one or more identifiers associated with the entity (i.e., "entity identifiers"), where the one or more of the identifiers originate from one or more different scopes of identification (e.g., different indices of unique identifiers).

Some implementations can provide an indexing and/or connection service configured to utilize an identifier issued by a third-party in association with an entity, as a reference to connecting users to one or more network-based services specified by the entity (e.g., entity owner when the entity is a business), such as the entity's web site or the entity's online profile. The entity (or party entrusted by the entity) can specify (e.g., create, remove, or update) what network-based service a third-party issued identifier refers to upon approval by the entity, which can be facilitated using a form of communication that is based on the third-party issued identifier. For instance, where the third-party issued identifier is an e-mail address, approval can be facilitated through an e-mail to the e-mail address. The e-mail can comprise a passcode that permits specification of the network-based service, and/or can comprise a universal resource locator address/link to a web page that permits specification of the network-based service.

Hereinafter, third-party issued identifiers will also be referred to simply as "third-party identifiers," where the third party is one different from the service provider facilitating the connection between the third-party identifier and a network-based service.

Accordingly, various implementations can make use of any single index of identifiers, beyond just telephone numbers, such as an e-mail, Twitter ID®, government ID or any alpha-numeric string that is proprietary to the user, to connect an entity-identifier with a network-based service controlled or associated with the entity, without the need for additional account setup. In doing so, such implementations can enable an entity (e.g., person, business, or organization) to a virtual distributed online identity that is built around proprietary identifiers already in their possession and uniquely associated with the entity (in a given scope of identification). Additionally, some implementations can permit adding a standard or custom suffix to an identifier to further create a further unique index configured to connect users to a limitless number of pages set by the owner of the identifier. Fattens or normalize all web sites and all internet pages to equal level (no hierarchy) weight and enable them to be reached in one-step by a direct indexed connection provided by us. Certain implementations permit fattening or normalization of web sites and Internet-accessible pages to at an equal level (e.g., with no hierarchy) and enable them to be reached in one-step by a direct indexed connection facilitated by the identifier. Various implementations can be configured to generate web short code from the identifier, where the web short code can point to any universal resource locator (URL).

As used herein, the term "access" can include read access, writing access, modification access, creation access, and deletion access (e.g., with respect to a network-based service). Depending on the implementation, "access" can be made public and made available without permission, or private and made available based on permission or approval. For example, for a particular user (hereinafter, also referred to as a "client user"), certain network-based services (e.g., public web page) can have public read-only access, other network-based services (e.g., private file sharing service) can have private read-only access, and yet further network based services (e.g., online bulletin board) can have private read-write access. A user accessing a given network-based service can include a user accessing the network-based service via a client computer system, and a computer process (e.g., computer software) accessing the network-based service as a client. At times, the owner of the identifier (e.g., person associated with the identifier) can be a user accessing an associated network-based service, possibly to update the information provided by their associated network-based service (e.g., update online schedule publicly access by way of the identifier). Depending on the implementation, a given network-based service associated with an identifier can have a default access mode (e.g., read-only access), which can be configured by the owner of the identifier.

Generally, the network-based service can be one provided by a server computing device, to a client computing device, over a network connection. The network-based service can include one or more web services or resources deliverable over a network connection, such as a web page (e.g., statically or dynamically updated), a web-based file sharing service, or web-based access to various file types (e.g., a post-script document file (PDF), a word processing document (e.g., Microsoft® Word® document), a spreadsheet (e.g., Microsoft® Excel®), etc.), a presentation (e.g., Microsoft® PowerPoint®) and the like. Where the network-based service is a web-based service or resource, a client computing device can access the network-based service by way of a web browser application (e.g., Mozilla® Firefox®, or Microsoft® Internet Explorer®) operating on the client computer device.

The identification data can comprise one or more unique identifiers that are generally proprietary to the given entity (e.g., given entity has some form of "ownership" or control over the identifier), such as a telephone number (e.g., mobile number or landline number), an e-mail address, a username to a third-party account (e.g., Twitter® ID, Google® username, or Yahoo® username), a third-party provisioned identifiers (e.g., government employee ID, or company ID), and the like (e.g., any alphanumeric string that is associated with and proprietary to the entity, such as social security number for a person-entity, or DUNS(s) number for a business-entity). Generally, any proprietary identification "owned' by an entity (e.g., person, company, organization or agency) can become part of a unique identification index to entity-controlled specific network-based services, such as a web page or web-accessible file. For example, under U.S. Federal Communications Commission's (FCC's) "local number portability" (LNP) rules, mobile numbers have effectively become a proprietary number or identification code. The proprietary identifier can utilized as a root and pseudo-name, which with the addition of an optional alphanumeric suffix, connects to network-based service, thereby providing the entity-owner their own private network (e.g., private network of web pages).

Yet further examples of identifiers for entities can include those issued or regulated by governmental agencies, including postal codes, airport codes, government agency identifiers (e.g., social security), and the like. For identifiers provided by a third-party, the scope of identification from which the identifier originates (and in which the unique identifier is uniquely associated with the given entity) is generally controlled, provisioned, and/or maintained by the third party. The third party can, for example, can be responsible for provisioning and/or uniquely associating a given identifier to a given entity.

For example, an account username controlled, provisioned, and/or maintained by Twitter®, Google®, Yahoo®, or Microsoft® can be utilized as an identifier that is unique within a given scope of identification (e.g., a given Twitter® ID is unique from other Twitter® IDs) and that can access a network-based service associated with the owner of the account username. In another example, a telephone number (e.g., mobile number or landline number) controlled, provisioned, and/or maintained by a telephone carrier or service provider, such as Verizon®, AT&T®, Sprint®, and the like.

Though an identifier from a given scope of identification is generally unique within that scope, it may not be unique across other scopes of identification. For instance, though a Twitter® ID associated with a given entity can be unique within the scope of all possible Twitter® IDs (and possibly uniquely associated to the given entity), those skilled in the art will appreciate that in other scopes of identification, the same identifier can be associated with a different entity and/or associated with more than one entity. Accordingly, an identifier utilized by various implementations can be unique with respect to a particular scope of identification, can be uniquely associated to a given entity in the particular scope of identification, and can be proprietary to the given entity.

By employing third-party identifiers that are uniquely associated with an entity (e.g., person, organization, or business) within scope of identification controlled by a third-party (e.g., third-party controlled account username registry, or telephone number registry), some implementations permit the entity (e.g., person or business that owns and is associated with the unique identifier) to utilize the third-party unique identifier to quickly and easy create/setup/update a network-based service (e.g., personal web page, or a PDF of person's resume) in connection with the third-party unique identifier, such that the created/setup/updated network-based service can be quickly and easily accessed by others using the third-party unique identifier. Additionally, some such implementations permit the creation/setup/update of the network-based service without additional need to establish an account with the service provider facilitating the connection between the third-party unique identifier and the network-based service.

The connection process provided by various implementation can obviate the need to search for network-based services in connection with an entity using identifiers disclosed by the entity (e.g., e-mail address, telephone number, etc.). Some implementations can provide connection to only one result web page, where when a unique third-party issued identifier is entered into an implementation, there is only one possible result that the third-party issued identifier is connected to. According, certain implementations facilitate one-step connections to any web pages associated with an entity, using a unique alphanumeric index that are proprietary and representative of the entity. Such implementations can deliver only one result without the need for intermediate steps or choices.

For some implementations, the unique identifier utilized can be an identifier that can be employed in communicating with the entity over a given form of communication. For instance, an entity's mobile telephone number can be utilized as a unique identifier by which the entity's network-based service can be referenced and accessed by a client user. As understood in the art, an entity's mobile telephone number can be used to communicate with the entity via a traditional telephone call or using a mobile messaging service, such as Short Messaging Service (SMS), Multimedia Messaging Service (MMS), and the like. Additional examples of identifier that can be used in particular messaging systems include e-mail, instant messaging, and the like. For some implementations, unique identifiers that can facilitate communication with an entity can be utilized in approving (user) access to one or more network-based services that are referenced by way of the unique identifier. Continuing with the example of the mobile telephone number operating as a unique identifier, an implementation can grant a particular user (temporary) write access to a network-based service by prompting the user to enter a specific (usually dynamically generated) passcode when requesting write access to the service (e.g., after be directed to the network-based service using the mobile telephone number as a reference), sending the specific passcode via a SMS message using the mobile telephone number unique identifier, and entering the specific passcode provided in the SMS message. For some such implementations, it is assumed that only the owner of the unique identifier (e.g., owner of the telephone number) and/or individuals trusted by the owner have access to the messaging services utilizing the unique identifier or have access to the passcode provided by the messaging service.

For some implementations, a given unique identifier can provide a given user access to a single network-based service that is associated with the entity to which the given unique identifier belongs. This can happen, for example, when given unique identifier alone used as-is without modifiers. For some implementations, the given unique identifier can provide access to a two or more network based services that are associated with the entity to which the given unique identifier belongs. Certain implementation can facilitate this by accepting affixes (e.g., prefix or suffix), in conjunction with the given unique identifier, in order to select between the different network-based services available in association with the entity.

Particular implementations can be utilized in establishing a network-accessible, information data store (hereinafter, also referred to as a "silo") configured to index information associated with an entity (e.g., a person or a business entity) according to a third-party provisioned or controlled unique identifier that is associated with the entity, and provide access to that information by way of the third-party unique identifier (e.g., using the third-party unique identifier as a reference when accessing a silo). Various silos can relate to different subjects and/or to specific areas of interest.

According to one implementation, an identifier associated with an individual, such as a personal mobile number, an e-mail, or a Twitter® ID, which are unique within their respective scope of identifications, can be used by the individual to provide a one-step connection and access to that individual's latest profile, résumé, corporate bio, personal or corporate brand page or any file, photo or data that is related to that individual. By the same one-step connection process (and subsequent approval process), the individual can remove and otherwise update what (network-based service) is provided when identifier is referenced. As noted herein, what network-based service is provided by an identifier can depend on the silo being accessed and/or the affix utilized with the identifier at the time of the identifier is referenced (e.g., identifier used with a prefix that the individual associated with a network-based service that provides their favorite recipes). For some implementations, the network-based service can be a redirect to another universal resource locator [URL] on the Internet defined by the individual associated with/owning the identifier.

Certain implementations can operate as a metadata-level connector for a given entity (e.g., person, organization, or business associated with an identifier) across all various silos. For example, an implementation can be operable in connecting a user to an entity's one or more social networking pages (e.g., Facebook® or LinkedIn®) through the entity-associated unique identifier (e.g., telephone number). Implementations that function as a social network connector can obviate a user's need to determine (e.g., search for) or obtain the unique URL format and syntax that is often required when trying to locate an entity's home page or public profile page (social networking profile). Effectively, various implementations can permit an entity to register one or more associations between their telephone number (e.g., mobile telephone number) and one or more URLs associated with web pages (e.g., social network profile pages) associated with the entity (e.g., personal profile page on Facebook® and profile page on LinkedIn®, each being accessed using a different suffix). Additionally, various implementations can permit one or more social networks to utilize an identifier in a standard connection convention or protocol, whereby: a an entity's identifier (e.g., personal mobile number) can be used as standard identifier for a social networking profile or home page associated with the entity; an entity's identifier can function as a permanent link to an entity's active profile page; and adjustments to an entity's identifier can result in an adjustment to an global adjustment to each of the different social networks (e.g., block or shut off entity's identifier's link to certain social network pages as needed).

Various implementations can be employed in flattening or normalizing web services (e.g., web site and related web pages) in association with businesses, and enabling access to these business web services via a unique identifier. For example, in connection with a given restaurant, some implementations can provide a user with a direct connection to any web page on the restaurant's web site by way of the restaurants business telephone number and an affix (e.g., suffix). For instance, by entering RestaurantTelephoneNumber/H into the appropriate field (e.g., information silo indexed by telephone numbers, or restaurant information silo indexed by restaurant telephone numbers), a user can be directed to the home page of the restaurant. Other affixes (e.g., suffices) can provide access to other web pages (e.g., sub-page) on the restaurant's web site, such as a web page that lists the restaurant's menu, wine list, daily specials, directions, coupons, and the like. For example, for a restaurant having the telephone number 212-515-1234, entering 212-515-1234/h can direct a user to the restaurant's home page, while 212-515-1234/R directs the user to a reservation web page, and 212-515-1234/W directs the user to the wine list web page. Other examples of affixes that can be utilized in association with a restaurant can include A for address and contact information, B for breakfast menu, N for brunch menu, L for lunch menu, D for dinner menu, W for wine list or other beverages, E for entertainment, P for private rooms or catering, T for takeout or delivery, O for online ordering, C for coupons and special offers, and J for jobs available at the restaurant. Further, certain implementation can permit an entity or an agent of the entity (e.g., manager or owner of the restaurant) to associate custom affixes with a given identifier.

Various implementations can connect a user directly to a web page of any company, subject or offer that is printed in an article, advertisement, TV or radio. It can bypass exposure to competitors' advertisements, search results, SEO intercepts and hijackings, and generates accurate analytics. An implementation can create a 1-step link from printed advertisements directly to the associated web site of the advertiser. This could be a company, hotel, product, special offer; the application is limitless. Users could receive the exact page related to the ad without search, navigation or misdirects. Use of implementations can also provide analytics of every visitor to show the ads effectiveness, which is often In a real estate context, certain implementations can enable individual real estate agents to create their own private inventory of real estate using their telephone number (e.g., mobile number), which can be combined with a property ID (e.g., MLS number) thereby protecting the agent from hijacking. Implementations can launch a universal service for real estate agents and/or property seekers by providing a single destination site (e.g., silo) where an individual's mobile telephone number and property ID will always connect to the most current info on that property. With a unique affix (e.g., suffix) combined with the agents telephone number, a web link is created that can direct a user to web page relating to a piece of real estate.

Some implementations provide an asynchronous on-demand message service that enables the posting of a confidential note, an address, a price, or any other private data, that subsequently can be (securely) retrieved by designated recipients who have the associated identifier and, for example, a confidential passcode. Such implementations can serve the private message markets that currently require registration and an elaborate setting of buttons to assure privacy. Such implementations can avoid registration (asynchronous) and can automatically present (open) when the associated identifier and passcode are presented in a data entry in a field provided by an implementation.

For some implementations, a user can post a confidential note, address, price or any other data and have it retrieved by a visitor that have the password or note lock code. Implementations can permit retrieval through a web page or via mobile device (e.g., Internet or SMS). For example, with respect to SMS retrieval, a visitor could send a mobile telephone and a pass code to intended recipients (e.g. 9171114444/p71), which the recipient can use to retrieve the private note.

A typical note lock message could be the location of a private party and the passcode is how someone can unlock and read the message. In the commercial context, such implementations could be used for promotions in advertising to use a telephone number with a certain code extension to know, for example, the location of the wine tasting.

Various implementations can permit family caregivers to keep a large network or family aware of the status of a patient without having to answer numerous telephone inquires. For example, family members and friends worldwide can obtain patient status 24/7 without inundating the caregiver by using a mobile number and security code to review a web page that provide a patient's status (e.g., to the extent permitted by HIPAA). A caregiver could register on system or partner site and post messages or updates at will. Anyone with just the caregiver's telephone number and message code can then obtain that check a status message 24/7 without interrupting the caregiver.

Certain implementations can permit the addition of a affix (e.g., suffix) to the company telephone number, which can result in a direct connection to common sub-pages. These suffixes can be unlimited and companies and organization can create any notation to be added to phone and connection to announcement, product pages etc. Fixed suffixes can be provided by an implementation to avoid the steps, time and work associated with learning how to navigate each new site map. In this manner, certain implementations flatten or normalize the various geometries of the various web site designs. Fixed suffixes for companies can include: MT for Management Team; BD for Board Of Directors; IR for Investor Relations; or HR for human resources. Implementations can allow companies to add an unlimited set of custom suffixes to their root index.

At times, companies do permit a social network link to be printed on a business card. Accordingly, implementations can enable the listed telephone number to represent a professional or social profile. Using such implementations, a hiring agent can, for example, quickly and instantly view the resumes of the people they met by just entering the telephone number from their business card on any implementation supported connection box.

In the context of providing private message, with a message tag a user can also create a password (e.g., K52) and write that on the back of the business card. An acquaintance can then enter the telephone number on the business card and password (e.g., K52) on an implementation and get the detailed or confidential message on-demand any time. In some implementations, a personal calling card can be created with a notation of your brand and an easy method of what your personal index is.

When meeting someone at a party, social event, business meeting or other gathering there is normally not a lot of time to explain who you are. By having a telephone number act as a link, an acquaintance can use the telephone number to connect a bio or any other profile page that has been associated with the telephone number assigned.

With respect to URLs, implementation s can use their own personal indexes as a root and any actual word of their choice, and can be reused.

With the expansion of non-Latin domain names, it has become harder to reach relevant web sites due to language barriers. Accordingly, certain implementations can enable a user to reach a web site in any language or any county by just using the telephone number or any other index associated with the web site. This can be useful, for example, for non-Latin Top Level Domains, such as those of the Russian sites (e.g., http://правительство.рф [government] has the TLD of рф, where Российская Федерация is transliterated as Rossiyskaya Federatsiya, the Russian Federation).

Non-Latin domain names open the internet to many new users and generate new opportunities and applications for System to be the Meta level connector of these pages Some implementations can connect users to worldwide government pages with simple digit codes (e.g., 3 digits). Likewise, implementations can utilize postal codes for the home page of cities around the world (e.g., and further enabling addition of suffices for police, fire and other standard pages), airport codes for airport web sites and/or flight schedules for a given airport, or alphanumeric labels that go directly to the desired government agency web sites.

FIG. 1 shows an example of an entity identifier-referenced network-based service system 100 in accordance with some implementations. In the example of FIG. 1, the entity identifier-referenced network-based service system 100 includes an entity identifier-referenced network-based service server 102, a network 104, and network-based service clients 106-1 to 106-M (hereinafter, collectively referred to as the network-based service clients 106).

In the example of FIG. 1, the network 104 can include a networked system that includes several computer systems coupled together, such as the Internet, or a device for coupling components of a single computer, such as a bus. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the network 104 broadly includes, as understood from relevant context, anything from a minimalist coupling of the components illustrated in the example of FIG. 1, to every component of the Internet and networks coupled to the Internet.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD); or some other applicable known or convenient display device.

In one example of operation, the computer system can be controlled by operating system software that includes a file management system, such as a disk operating system. File management systems are typically stored in non-volatile storage and cause the processor to execute the various acts required by the operating system to input and output data and to store data in the memory, including storing files on the non-volatile storage. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. Another example of operating system software with associated file management system software is VM (or VM/CMS), which refers to a family of IBM virtual machine operating systems used on IBM mainframes System/370, System/390, zSeries, System z, and compatible systems, including the Hercules emulator for personal computers.

Some portions of this paper may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not necessarily inherently related to any particular computer or other apparatus. Various general purpose systems may be used with programs to configure the general purpose systems in a specific manner in accordance with the teachings herein, or it may prove convenient to construct specialized apparatus to perform the methods of some embodiments. The required structure for a variety of these systems will appear from the description below. In addition, the techniques are not described with reference to any particular programming language, and various embodiments may thus be implemented using a variety of programming languages.

Referring once again to the example of FIG. 1, the entity identifier-referenced network-based service server 102 is coupled to the network 104. The entity identifier-referenced network-based service server 102 can be implemented on a known or convenient computer system. Though only one instance of the entity identifier-referenced network-based service server 102 is illustrated in FIG. 1, it should be understood that specific implementations could have multiple servers. Moreover, partial functionality might be provided by a first device and partial functionality might be provided by a second device, where together the first and second devices provide the full functionality attributed to the entity identifier-referenced network-based service server 102.

In the example of FIG. 1, the entity identifier-referenced network-based service server 102 can include engines and/or datastores to assist users at network-based service clients 106 in accessing/connecting network-based services associated with a given identifier. Engines, as described below and in this paper generally, refer to computer-readable media coupled to a processor. The computer-readable media have data, including executable files, the processor can use to transform the data and create new data. An engine can include a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

As described in this paper, a datastore can be implemented, for example, as software embodied in a physical computer-readable medium on a general- or specific-purpose machine, in firmware, in hardware, in a combination thereof, or in an applicable known or convenient device or system. Datastores described in this paper are intended, if applicable, to include any organization of data, including tables, comma-separated values (CSV) files, traditional databases (e.g., SQL), or other known or convenient organizational formats.

In an example of a system where the datastore is implemented as a database, a database management system (DBMS) can be used to manage the datastore. In such a case, the DBMS may be thought of as part of the datastore or as part of the granular job vehicle transaction server 104, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data. The granular job vehicle transaction server 104 can also include engines and/or datastores to assist used vehicle buyers and sellers with similar economic incentives find one another and intelligently enter into an efficient used vehicle transaction.

In the example of FIG. 1, the network-based service clients 106 are coupled to the network 104. The network-based service clients 106 can be implemented as clients of the entity identifier-referenced network-based service server 102. Regardless of how the relationship with the entity identifier-referenced network-based service server 102 is characterized, the network-based service clients 106 can receive data from the entity identifier-referenced network-based service server 102, which can include executable software, served by the entity identifier-referenced network-based service server 102. In this example, the network-based service clients 106 can include engines, datastores, and/or user interfaces to assist users at network-based service clients 106 in accessing/connecting network-based services associated with a given identifier.

Figure 2:
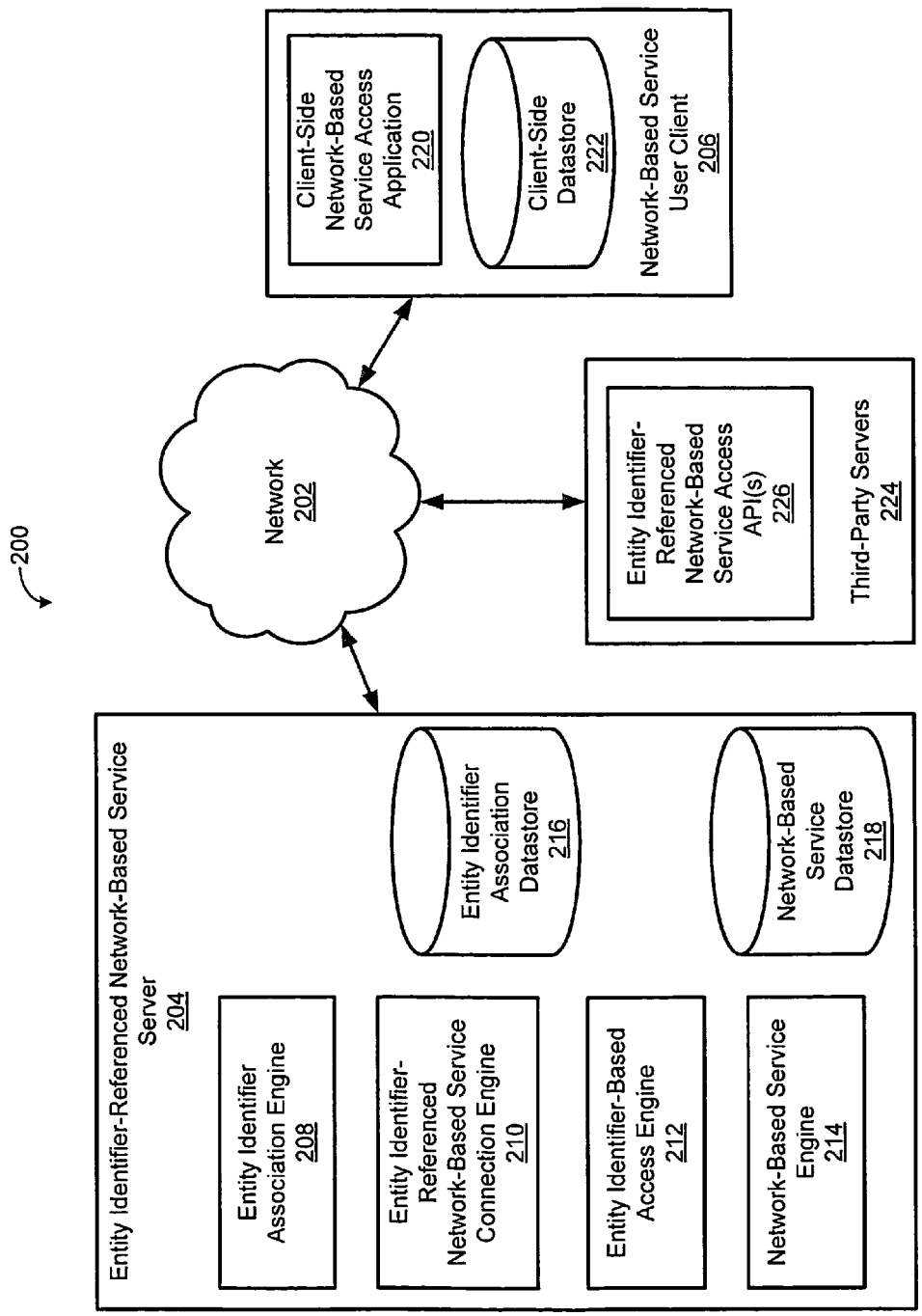
FIG. 2 shows an example of an entity identifier-referenced network-based service system that connects a client to network-based service by way of an entity identifier in accordance with some implementations.

FIG. 2 shows an example of an entity identifier-referenced network-based service system 200 that connects a client to network-based service by way of an entity identifier in accordance with some implementations.

Figure 3:
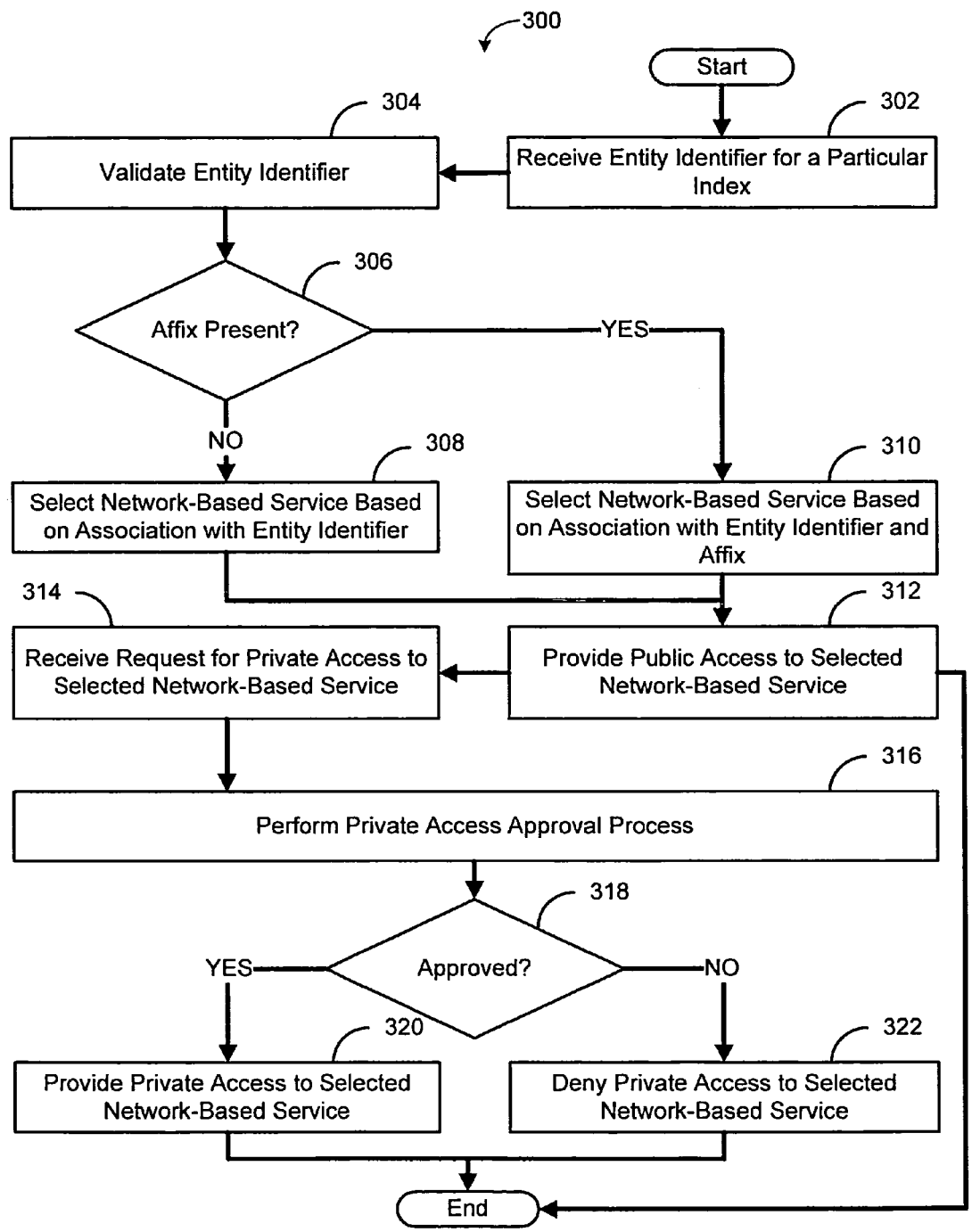
FIG. 3 shows an example of a method for providing access to a network-based service by way of an entity identifier in accordance with some implementations.

FIG. 3 shows an example of a method 300 for providing access to a network-based service by way of an entity identifier in accordance with some implementations.

Figure 4:
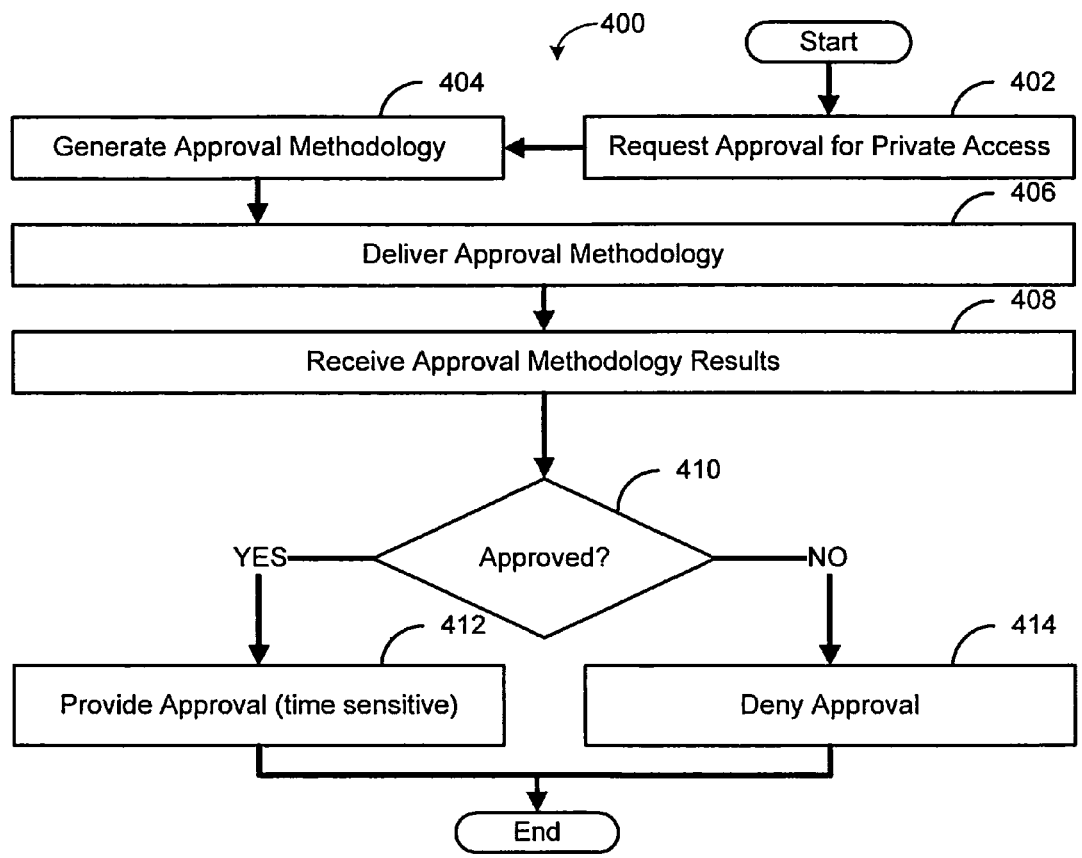
FIG. 4 shows an example of a method for approving access to a network-based service accessed by way of an entity identifier in accordance with some implementations.

FIG. 4 shows an example of a method 400 for approving access to a network-based service accessed by way of an entity identifier in accordance with some implementations.

Figure 5:
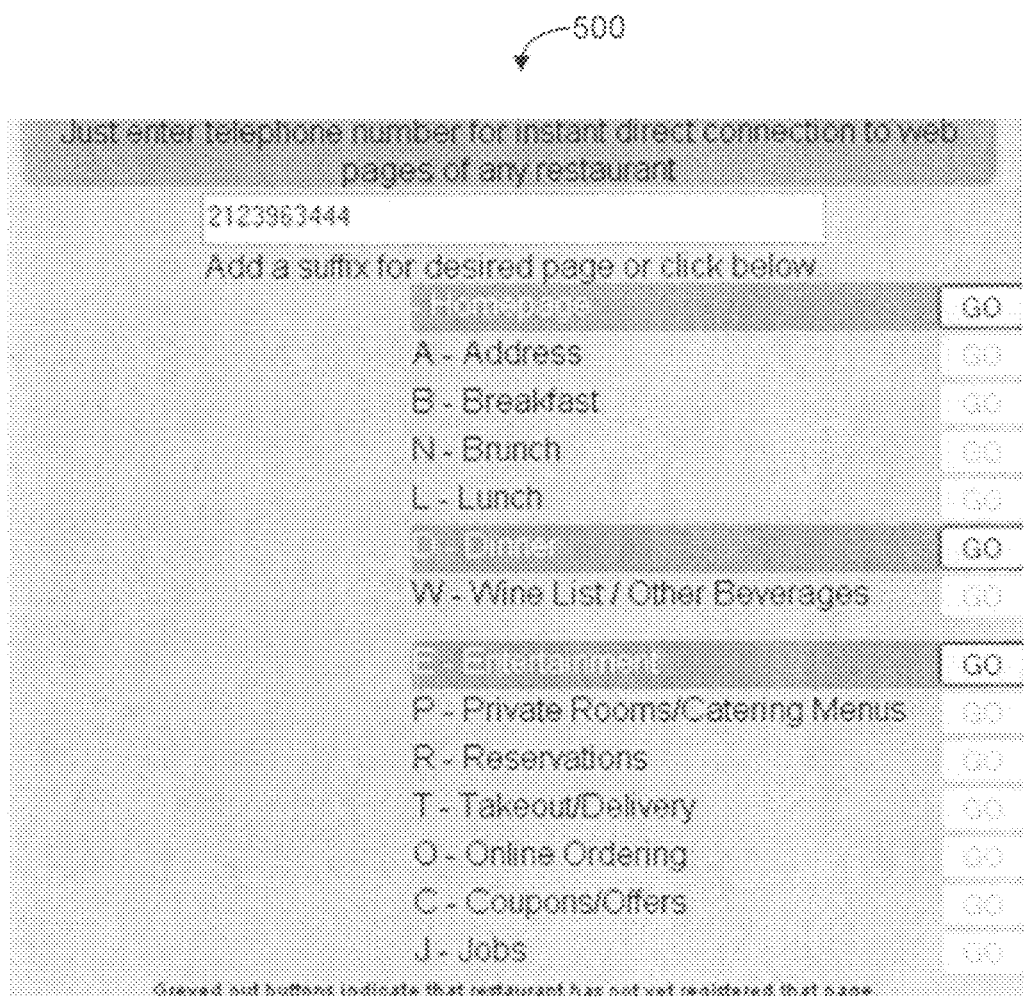
FIG. 5 shows an example of graphical interface presented in connection with a telephone number-identifier in accordance with some implementations.

FIG. 5 shows an example of graphical interface 500 presented in connection with a telephone number-identifier in accordance with some implementations. As shown, various implementations can provide sub-pages normalized in a single dimension and present the sub-pages in table form so that a user without having to enter a telephone number with a suffix.

Figure 6:
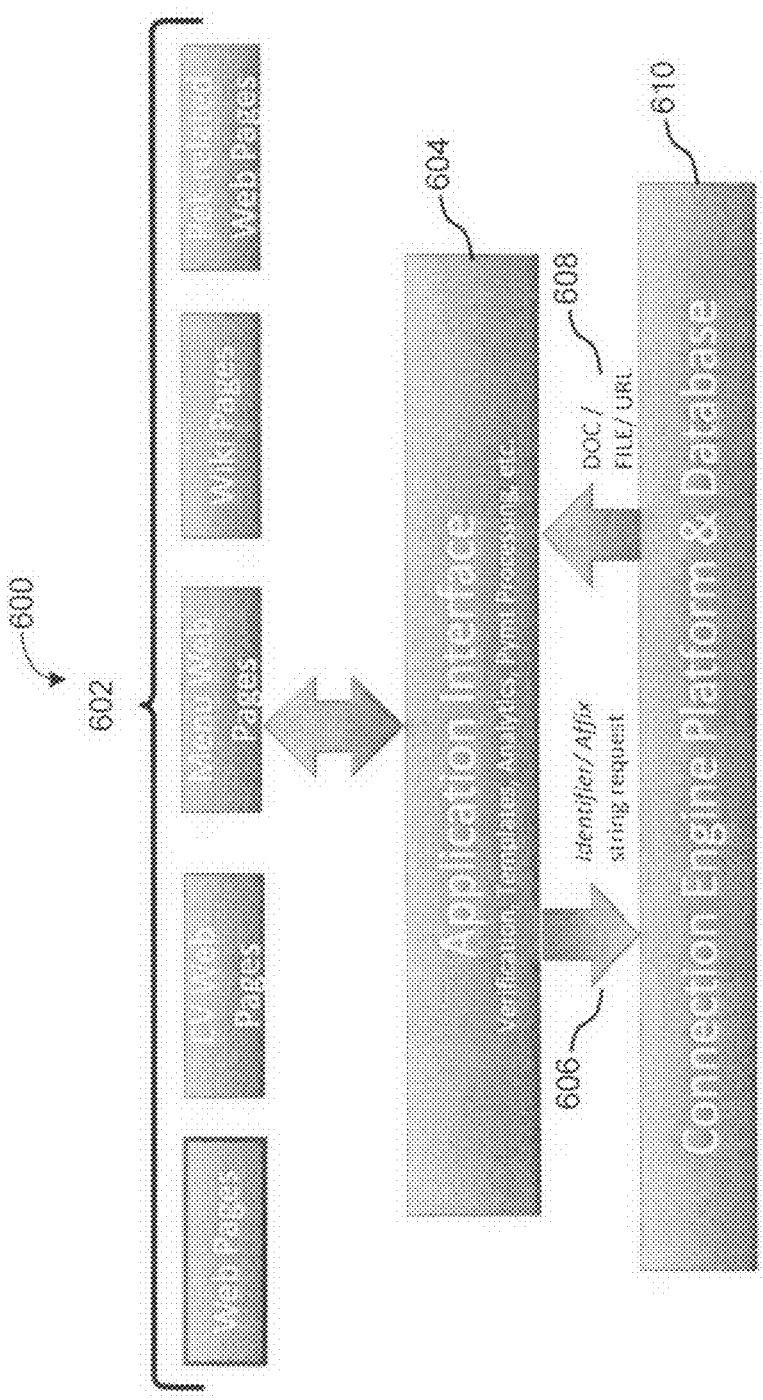
FIG. 6 shows an example of an architecture in accordance with some implementations.

FIG. 6 shows an example of an architecture 600 in accordance with some implementations. Implementations can provide a set of APIs or a connection box that can be installed on any partner site. A connection box can be 'white labeled' so that the partner can label it to support any specific application. For example, a magazine could create a connection box on their site www.XYZ.com and direct readers of ads or listing in their publication to enter the telephone or web code on the site. Such implementations can increase the traffic to the publisher's web site, give integrity to advertiser's links, and provides valuable analytics.

Implementations can also provide software downloads using an entry box on a browser bar, where the browser bar receives a user-entered telephone number and instantly connect to the needed web site, possibly without opening a new browser window.

Figure 7:
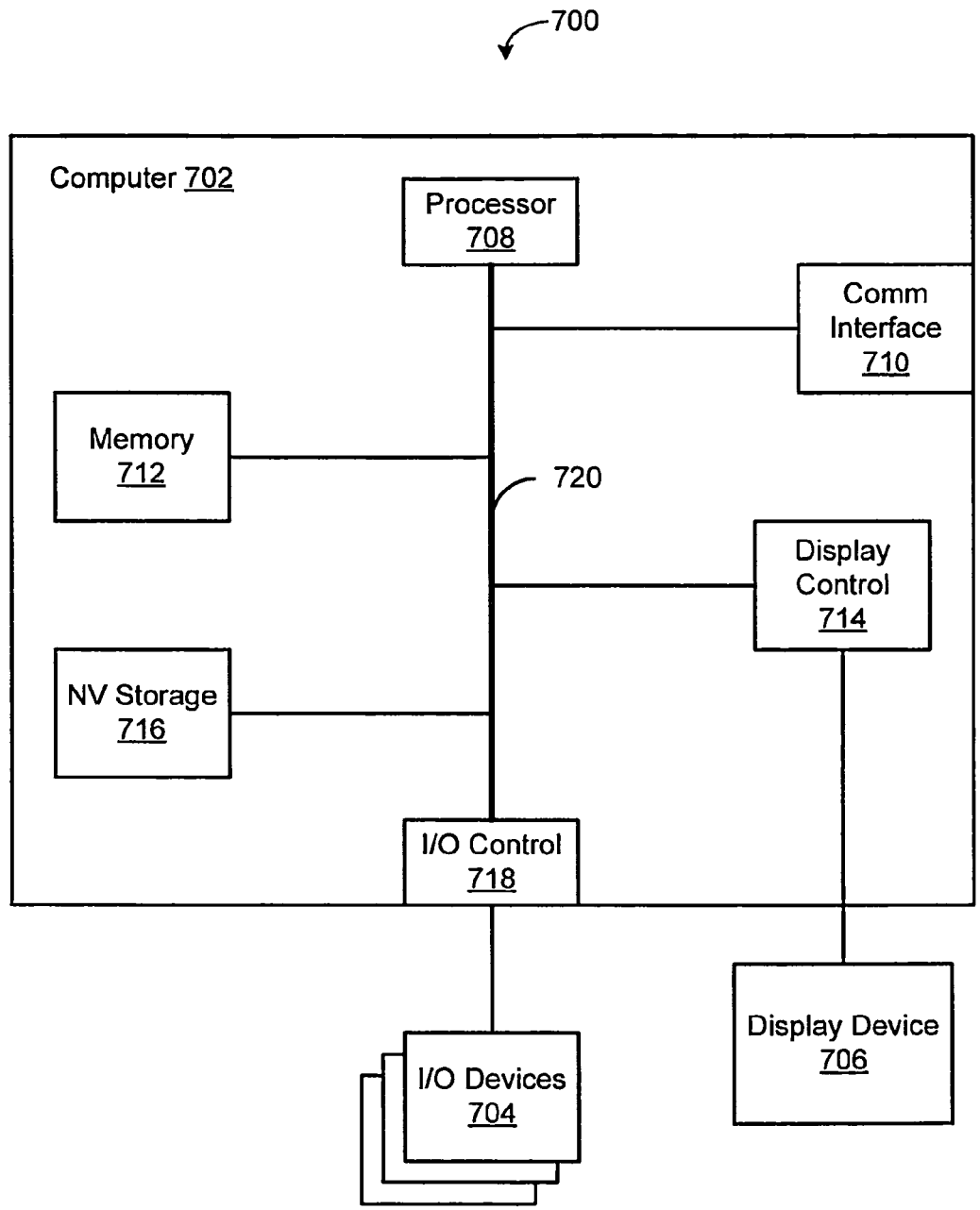
FIG. 7 shows an example of a computer system that can be utilized in some implementations.

FIG. 7 shows an example of a computer system 700. In the example of FIG. 7, the computer system 700 can be a conventional computer system that can be used as a client computer system, such as a wireless client or a workstation, or a server computer system. The computer system 700 includes a computer 702, I/O devices 704, and a display device 706. The computer 702 includes a processor 708, a communications interface 710, memory 712, display controller 714, non-volatile storage 716, and I/O controller 718. The computer 702 may be coupled to or include the I/O devices 704 and display device 706.

In the example of FIG. 7, the computer 702 interfaces to external systems through the communications interface 710, which may include a modem or network interface. It will be appreciated that the communications interface 710 can be considered to be part of the computer system 700 or a part of the computer 702. The communications interface 710 can be an analog modem, ISDN modem, cable modem, token ring interface, satellite transmission interface (e.g. "direct PC"), or other interfaces for coupling a computer system to other computer systems.

In the example of FIG. 7, the processor 708 may be, for example, a conventional microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the memory 712, also to the non-volatile storage 716, to the display controller 714, and to the I/O controller 718.

In the example of FIG. 7, the I/O devices 704 can include a keyboard, disk drives, printers, a scanner, and other input and output devices, including a mouse or other pointing device. The display controller 714 may control in the conventional manner a display on the display device 706, which can be, for example, a cathode ray tube (CRT) or liquid crystal display (LCD). The display controller 714 and the I/O controller 718 can be implemented with conventional well known technology.

In the example of FIG. 7, the non-volatile storage 716 is often a magnetic hard disk, an optical disk, or another form of storage for large amounts of data. Some of this data is often written, by a direct memory access process, into memory 712 during execution of software in the computer 702. One of skill in the art will immediately recognize that the terms "machine-readable medium" or "computer-readable medium" includes any type of storage device that is accessible by the processor 708 and also encompasses a carrier wave that encodes a data signal.

In the example of FIG. 7, the computer system 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it may lack some of the features shown in FIG. 7, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

I claim:

1. A method, comprising:
   receiving from a client computer system an entity identifier uniquely associated with a real world entity in a scope of identification, the entity identifier being issued by a third party in association with the real world entity;
   receiving a network-based service identifier;
   selecting a network-based service uniquely associated with the entity identifier and the network-based service identifier, wherein the network-based service is selected from a plurality of network-based services associated with the real world entity, and wherein the network-based service identifier assists in identifying the network-based service from the plurality of network-based services;
   determining a public access parameter to the network-based service; and
   providing the client computer system with public access to the network-based service according to the public access parameter.

2. The method of claim 1, wherein the entity identifier is a telephone number, an e-mail address associated with the real world entity, or an alphanumeric string associated with and proprietary to the real world entity.

3. The method of claim 1, wherein the scope of identification is implemented in an index of unique identifiers issued to the real world entity by the third party.

4. The method of claim 1, wherein the network-based service identifier is received as a suffix or a prefix to the entity identifier.

5. The method of claim 1, further comprising determining a geographical location of the client computer system, wherein the geographical location assists in determining the scope of identification.

6. The method of claim 1, further comprising:
   receiving from the client computer system a request for private access to the network-based service;
   performing an approval process for providing private access to the network-based service; and
   upon approval, providing the client computer system private access to the network-based service.

7. The method of claim 6, wherein the performing the approval process for providing private access comprises soliciting approval from the real world entity for the request for private access, the solicitation being transmitted to the real world entity by a communication system operable with the entity identifier.

8. The method of claim 6, wherein the performing the approval process for providing private access comprises:
generating a passcode in connection with the network-based service;
delivering the passcode to the real world entity by way of a communication system operable with the entity identifier;
prompting the client computer system for the passcode.

9. The method of claim 1, wherein the network-based service comprises a web page, web-based access to a document file, a web-based file sharing service, or a web-based media album.

10. The method of claim 1, wherein the real world entity is a person, a family, a government organization, a business organization, or a non-business organization.

11. A system, comprising:
at least one processor; and
a memory storing instructions that, when executed by the at least one processor, cause the system to:
receive from a client computer system an entity identifier uniquely associated with a real world entity in a scope of identification, the entity identifier being issued by a third party in association with the real world entity;
receive a network-based service identifier;
select a network-based service uniquely associated with the entity identifier and the network-based service identifier, wherein the network-based service is selected from a plurality of network-based services associated with the real world entity, and wherein the network-based service identifier assists in identifying the network-based service from the plurality of network-based services;
determine a public access parameter to the network-based service; and
provide the client computer system with public access to the network-based service according to the public access parameter.

12. The system of claim 11, wherein the entity identifier is a telephone number, an e-mail address associated with the real world entity, or an alphanumeric string associated with and proprietary to the real world entity.

13. The system of claim 11, wherein the scope of identification is implemented in an index of unique identifiers issued to the real world entity by the third party.

14. The system of claim 11, wherein the network-based service identifier is received as a suffix or a prefix to the entity identifier.

15. The system of claim 11, wherein the instructions cause the system to further determine a geographical location of the client computer system, wherein the geographical location assists in determining the scope of identification.

16. The system of claim 11, wherein the instructions cause the system to further:
receive from the client computer system a request for private access to the network-based service;
perform an approval process for providing private access to the network-based service; and
provide the client computer system private access to the network-based service upon approval.

17. The system of claim 16, wherein the performing the approval process for providing private access comprises soliciting approval from the real world entity for the request for private access, the solicitation being transmitted to the real world entity by a communication system operable with the entity identifier.

18. The system of claim 16, wherein the performing the approval process for providing private access comprises:
generating a passcode in connection with the network-based service;
delivering the passcode to the real world entity by way of a communication system operable with the entity identifier;
prompting the client computer system for the passcode.

* * * * *